United States Patent [19]
Oberndorfer et al.

[11] Patent Number: 5,879,618
[45] Date of Patent: Mar. 9, 1999

[54] APPARATUS FOR TREATING FINE ORE

[75] Inventors: Ernst Oberndorfer, Leonding; Gero Tessmer; Rudolf Weidinger, both of Linz, all of Austria; Roy Hubert Whipp, Jr., Miami, Fla.

[73] Assignees: Voest-Alpine Industrieanlagenbau GmbH, Austria; Brifer International Ltd., Barbados

[21] Appl. No.: 948,884

[22] Filed: Oct. 10, 1997

Related U.S. Application Data

[62] Division of Ser. No. 408,485, Mar. 22, 1995, Pat. No. 5,676,734.

[30] Foreign Application Priority Data

Mar. 24, 1994 [AT] Austria ........................................ 627/94

[51] Int. Cl.$^6$ ..................................................... C22B 1/10
[52] U.S. Cl. ............................... 266/91; 34/576; 34/591; 34/592; 266/157
[58] Field of Search ........................ 266/91, 157; 34/360, 34/359, 576, 591, 592

[56] References Cited

U.S. PATENT DOCUMENTS

| | | | |
|---|---|---|---|
| 3,578,296 | 5/1971 | Boucraut | 34/574 |
| 4,571,174 | 2/1986 | Shelton | 34/359 |

Primary Examiner—Melvyn Andrews
Attorney, Agent, or Firm—Ostrolenk, Faber, Gerb & Soffen, LLP

[57] ABSTRACT

An apparatus for treating fine ore in which fine ore is dried by aid of a hot drying gas flowing around the ore particles. After having flown around the ore particles, the drying gas is purified while releasing entrained dust ore particles. The dust ore particles are collected and admixed to the dried fine ore. In order to avoid process disturbances in the further processing of fine ore due to excessive portions of dust ore particles present without the fine ore, drying is effected in the whirl-bed method under simultaneous wind-screening of the fine ore. The drying gas is passed through the fine ore under formation of a whirl bed and the speed of the drying gas is fixed at a rate at which entraining of dust ore particles having dimensions below a predetermined dimension is effected. The dust ore particles entrained in the drying gas are separated, collected and admixed to the dried fine ore in dosed amounts. The apparatus includes a fine ore whirl-bed drying means including a drying-gas feeding means. A drying-gas purification means receives the hot drying gas from the whirl-bed drying means. A separating means separates from the hot drying gas dust ore particles entrained by the drying gas. A first collecting vessel receives the dust ore particles separated from the hot drying gas. A mixing means mixes the dried fine ore and the dust ore particles separated from the drying gas to a predetermined quantitative ratio.

8 Claims, 1 Drawing Sheet

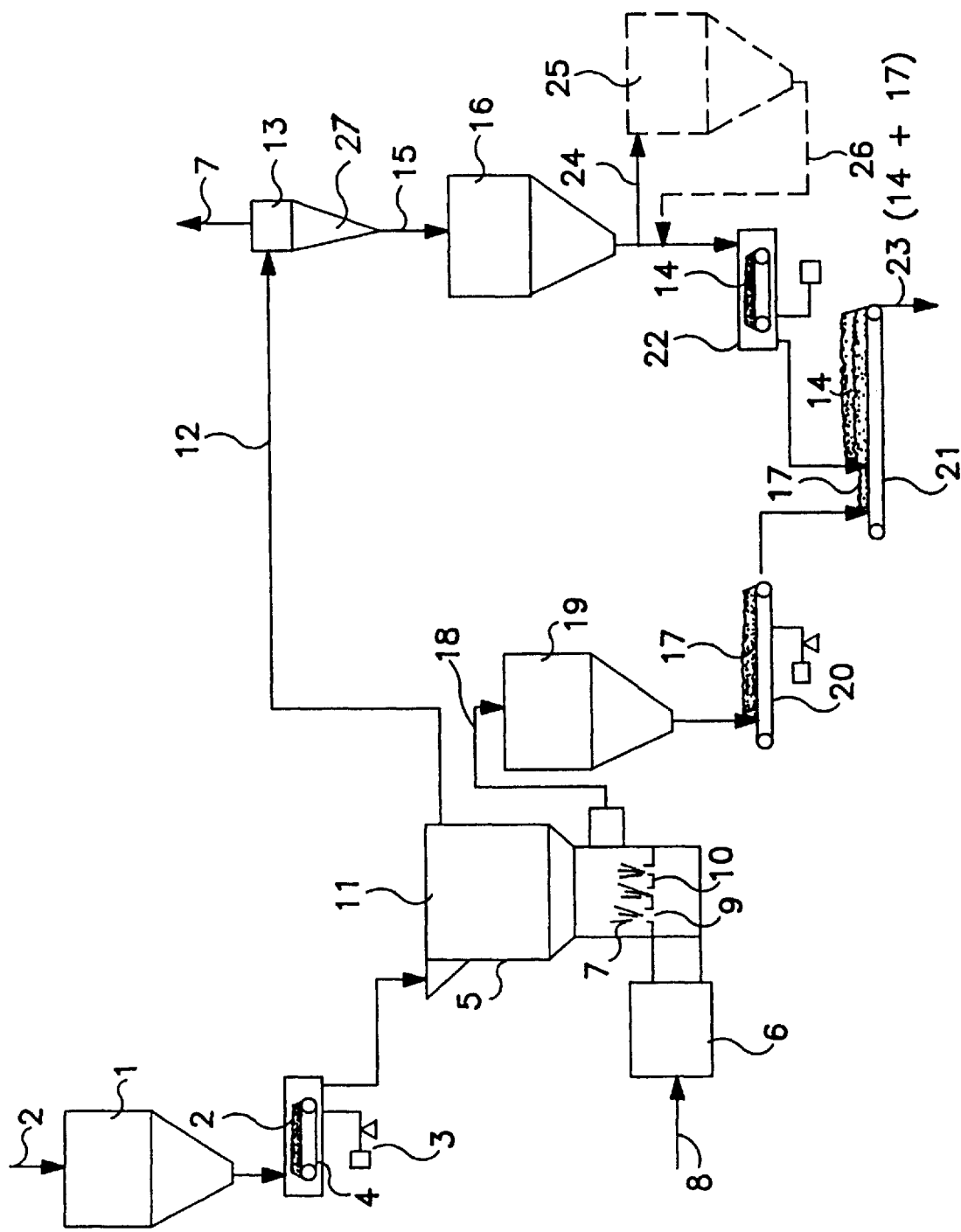

APPARATUS FOR TREATING FINE ORE

This is a division of application Ser. No. 08/408,485, filed Mar. 22, 1995, now U.S. Pat. No. 5,676,734, issued Oct. 14, 1997.

BACKGROUND OF THE INVENTION

1. Field of the Invention

The invention relates to a process for treating fine ore, wherein the fine ore is dried by aid of a hot drying gas flowing around the ore particles of the fine ore, the drying gas, after having flown around the ore particles, is purified while releasing entrained dust ore particles and the dust ore particles are collected and admixed to the dried fine ore, as well as an arrangement for carrying out the process.

2. Description of the Related Art

A process of this type is known from U.S. Pat. No. 5,082,251. There, drying of the fine ore is effected in a rotating drum type drier.

The further processing of fine ore, such as the direct reduction of fine ore, involves difficulties if dust ore particles are contained in the fine ore in excessive amounts, in particular, dust ore particles having dimensions smaller than 150 $\mu$m. An excessive portion of such dust ore particles in the fine ore is likely to give rise to serious process disturbances in further processing caused, for instance, by obstructed ducts, cyclones or by the formation of deposits in reactor vessels. Such disturbances also may arise if the portion of dust ore particles is acceptable as a whole, yet the distribution of the dust ore particles within the fine ore strongly varies. Consequently, maximum contents of dust ore particles may occur, lying considerably above the dust ore particle portion to be coped with without any disturbances; such maximum content portions may amount up to 50%.

From EP-A-0 149865 it is known to subject sulfidic ores to whirl bed drying. With this known process, the total amount of solids is supplied to gas purification together with the exit gas from whirl bed drying through a duct, the solids separated in purification being admixed to the previously separated solids without considering their grain dimensions. Thus, no wind-screening is provided there.

From CH-B-318.904 it is known to finely pulverize ore oxides and to subject the incurring powdery stock to wind-screening by using reducing gas for wind-screening. The coarser iron powder retained in wind-screening is returned to the pulverization procedure such that uniformly fine powder ore particles exclusively will be available to the reduction of the ore.

DE-A-1 458 755 relates to a process for controlling the grain size distribution and the fine grain concentration in whirl-layer reaction zones. There, a fine grain concentration ranging between 5 and 60% by weight is adjusted in the whirl layer by withdrawing fine grains of a predetermined grain size range from the whirl layer and returning them back into the whirl layer in circulation in given amounts. What is important there is to counteract the enrichment of the amount of fine grains contained in the whirl-layer reaction zone due to the formation of new fine grains caused by abrasion in that zone. Hence, that process does not deal with the treatment of fine ore, but with a process taking place during its reduction.

SUMMARY OF THE INVENTION

The invention avoids process disturbances in the further processing of fine ore due to excessive portions of dust ore particles present within the fine ore. In particular, strongly fluctuating portions of dust ore particles are to be avoided and an approximately constant quantitative portion of dust ore particles whose grain dimensions fall short of a predetermined grain size limit is to be present at any time in the fine ore subjected to further processing, wherein it is particularly suitable if dumping of dust ore particles can be avoided if at all possible.

In accordance with the invention, this is achieved with a process of the initially defined kind in that drying is effected in the whirl-bed method under simultaneous wind-screening of the fine ore, wherein the drying gas is passed through the fine ore under formation of a whirl bed and the speed of the drying gas is fixed at a rate at which entraining of dust ore particles having dimensions below a predetermined dimension is effected, and that the dust ore particles entrained by the drying gas are separated, collected and admixed to the dried fine ore in dosed amounts.

By collecting dust ore particles, it is feasible to block and balance out a temporarily present excess of dust ore particles, wherein the dust ore particles collecting are admixed to the direct reduction process in case fewer dust ore particles incur in drying than are consistent with further processing, or in case fewer dust ore particles incur than are intended to be supplied to further processing, such as a direct reduction process. The balance thus obtained allows for minimization, or even total avoidance, of portions of dust ore particles to be dumped.

According to the invention, advantageously also the dried fine ore, after having left the whirl bed, is collected and is mixed in dosed amounts with the dust ore particles fed in dosed amounts. Thereby, a uniform flow of dried fine ore is made available for admixture to the dried dust ore particles.

Suitably, mixing of the dried fine ore with the dust ore particles is effected at a quantitative ratio ranging from 90:10 to 70:30, preferably ranging from 80:20 to 85:15.

Advantageously, mixing of the dried fine ore with the dust ore particles is effected while observing a constant predetermined quantitative ratio, mixing of the dried fine ore with the dust ore particles suitably being effected while observing a constant overall amount per time unit.

It has been proved to be particularly suitable with a direct reduction process like that described, for instance, in U.S. Pat. No. 5,082,251, if the speed of the drying gas is fixed at a rate at which dust ore particles whose grain dimensions are smaller than 200 $\mu$m, preferably smaller than 150 $\mu$m, are entrained.

An arrangement for carrying out the process according to the invention is characterized by the following characteristic features:

a fine-ore whirl bed drier comprising a drying-gas feeder, a drying-gas purification means arranged to follow the whirl bed drier and comprising a separating means separating from the drying gas dust ore particles entrained by the drying gas, a collecting vessel receiving the separated dust ore particles, and a mixing means for mixing the dried fine ore with the dust ore particles separated from the drying gas to a predetermined quantitative ratio.

Advantageously, a collecting vessel receiving the dried fine ore is arranged to follow the whirl bed drier.

Suitably, a proportioning belt weigher for the dust ore particles is arranged to follow the collecting vessel receiving the separated dust ore particles, wherein, furthermore, a proportioning belt weigher for the dried fine ore advantageously likewise is arranged to follow the collecting vessel receiving the dried fine ore.

The drying gas advantageously is formed by burning a gas, wherefor the whirl bed drier suitably is equipped with a gas firing, preferably a natural gas firing, intended to produce a drying gas.

BRIEF DESCRIPTION OF THE DRAWINGS

In the following, the invention will be explained in more detail by way of an exemplary embodiment illustrated in the drawing, the drawing representing a process diagram according to a preferred embodiment.

DETAILED DESCRIPTION OF THE PREFERRED EMBODIMENT

The arrangement according to the invention comprises a storage tank 1 for fine ore 2, which, for instance, is used for the production of sponge iron by direct reduction with reducing gas. From the storage tank 1, the fine ore 2, via a proportioning belt 4 equipped with scales 3, gets into a whirl bed drier 5 provided with a gas firing 6 for producing a drying gas 7. The gas firing 6 advantageously is operated with natural gas 8. The drying gas 7 formed at the combustion of natural gas 8 is fed into the interior 11 of the whirl bed drier 5 through a distribution grid 10 provided with a plurality of tuyeres 9, the drying gas 7 emerging from the tuyeres of the distribution grid 10 at a predetermined rate. The rate of the drying gas 7 can be adjusted to the desired value by control of the gas firing 6.

On the upper end of the whirl bed drier 5, the drying gas 7 is fed, via a discharge duct 12, to a drying-gas purification means 13, which is designed as a cyclone separator 27. In the cyclone separator 27, the separation of dust ore particles 14 entrained with the drying gas 7 takes place, which dust ore particles are conveyed from the cyclone separator 27 to a collecting vessel 16 via a conveying duct 15.

The fine ore 17 dried in the whirl bed drier 5 and freed from dust ore particles 14, via a conveying duct 18, likewise reaches a collecting vessel 19 and from there is supplied, via a proportioning belt weigher 20, to a mixing means 21 for mixing the dried fine ore 17 with a predetermined portion of dust ore particles 14 likewise supplied to the mixing means 21 via a propotioning belt weigher 22. The mixing means 21 is designed as a conveying belt to be fed from the two proportioning belt weighers 20, 22.

The arrangement functions in the following manner:

In the whirl bed drier 5, a whirl bed forms under supply of drying gas 7 fed through the tuyeres 9 of the distribution grid 10 and ascending at a predetermined flow rate in the interior 11 of the whirl bed drier 5, fine particles, such as dust ore particles 14, having grain dimensions below a predetermined grain size limit being entrained by the drying gas 7. The grain size limit is a function of the flow rate of the drying gas 7. The flow rate of the drying gas 7 suitably is chosen such that all of the dust ore particles 14 having dimensions below approximately 150 $\mu$m are discharged along with the drying gas. These dust ore particles 14 are separated in the cyclone separator 13 and are supplied to the collecting vessel 16.

By aid of the two proportioning belt weighers 20, 22, the supply of dried fine ore 17 and dried dust ore particles 14 is adjusted in manner that a (preferred) quantitative ratio of dried fine ore 17 to dried dust ore particles 14 ranging from about 80:20 to 85:15 is obtained, the overall amount of the fine ore mixture 23 formed of dried fine ore 17 and of dust ore particles 14 being kept constant.

If an excessive amount of dust ore particles 14 incurs, a portion of the same may be conducted to a dumping ground or supplied to a further collecting vessel 25 for intermediate storage through a branch duct 24, the intermediately stored dust ore particles 14 being admixable together with the dried fine ore 17 at a later point of time in case the unscreened fine ore 2 supplied to the whirl bed drier 5 contains a smaller amount of dust ore particles 14, as is indicated by broken line 26.

The fine ore mixture 23 leaving the conveying belt 21 at a constant amount and a constant quantitative ratio of dried fine ore 17 to dried dust ore particles 14 per time unit subsequently is supplied to a direct reduction plant according to U.S. Pat. No. 5,082,251 or EP-A-0 571 358 or EP-B-0 010 627 for the purpose of producing sponge iron.

The process according to the invention enables the progression of such direct reduction processes without any problem, because process disturbances that might be caused on account of a sudden excessive amount of dust ore particles 14 are safely avoided.

In Table 1 below, fine ores I to IV having different contents of dust ore particles (grain dimensions below 150 $\mu$m) are listed:

TABLE 1

| Fine Ore | Dust Ore Particles % |
|---|---|
| I | 49 |
| II | 35 |
| III | 25 |
| IV | 18 |

These fine ores were used in the whirl bed drier 5 in the amounts (t/h) indicated in Table 2 for the production of 70 t/h of briquetted sponge iron (Table 2). The water content separated by the drying gas 7 likewise is indicated in Table 2. The dust ore particles 14 (grain dimension smaller than 150 $\mu$m) also indicated in Table 2 were discharged by the drying gas 7 and separated in the cyclone separator 13.

TABLE 2

| Fine Ore | Charge t/h | Water Content t/h | Dust Ore Particles t/h |
|---|---|---|---|
| I | 168 | 9.80 | 73.1 |
| II | 137 | 8.05 | 44.1 |
| III | 122 | 7.35 | 29.4 |
| IV | 113 | 6.65 | 21.0 |

From each of the fine ores I to IV, 86.1 t/h dried fine ore 17 freed from dust ore particles 14 were mixed together with 18.9 t/h dust particles 14 each (fine ore mixture 23, amount 105 t/h) and subjected to a direct reduction process as described in EP-A-0 571 358:

| Carbon supply | 0.7 t/h |
|---|---|
| Oxygen separated | 26.6 t/h |
| Losses on ignition | 4.2 t/h |
| Dust separated | 2.1 t/h |

72.1 t/h of sponge iron were produced. The losses during briquetting were 2.1 t/h such that sponge iron briquets incurred in an amount of 70 t/h.

Although the present invention has been described in relation to particular embodiments thereof, many other variations and modifications and other uses will become apparent to those skilled in the art. Therefore, the present invention is to be limited not by the specific disclosure herein, but only by the appended claims.

What we claim is:

1. An arrangement for treating fine ore formed of ore particles by drying said fine ore by hot drying gas flowing around said ore particles so as to obtain dried fine ore, purifying said drying gas, after having flown around said ore particles, under release of entrained dust ore particles, collecting said entrained dust ore particles and adding said entrained dust ore particles to said dried fine ore, which arrangement comprises:

a fine ore whirl-bed drying means including a drying-gas feeding means;

a drying-gas purification means arranged to receive said hot drying gas from said whirl-bed drying means and including a separating means configured to separate from said hot drying gas dust ore particles entrained by said drying gas;

a first collecting vessel configured to receive said dust ore particles separated from said hot drying gas; and a mixing means configured to mix said dried fine ore and said dust ore particles separated from said drying gas to a quantitative ratio.

2. An arrangement as set forth in claim 1, further comprising a second collecting vessel arranged to follow said whirl-bed drying means and configured to receive said dried fine ore.

3. An arrangement as set forth in claim 1, further comprising a proportioning belt weighing means for said dust ore particles arranged to follow said first collecting vessel configured to receive said dust ore particles separated.

4. An arrangement as set forth in claim 2, further comprising a proportioning belt weighing means for said dried fine ore arranged to follow said second collecting vessel configured to receive said dried fine ore.

5. An arrangement as set forth in claim 1, further comprising a gas firing means provided for said whirl-bed drying means and intended to produce said hot drying gas.

6. An arrangement as set forth in claim 5, wherein said gas firing means is a natural gas firing means.

7. An arrangement as set forth in claim 1, wherein said quantitative ratio ranges from 90:10 to 70:30.

8. An arrangement as set forth in claim 1, wherein said quantitative ratio ranges from about 80:20 to 85:15.

* * * * *